J. LANDSIEDEL.
LIGHTING SYSTEM.
APPLICATION FILED APR. 11, 1908.
1,025,196.
Patented May 7, 1912.
4 SHEETS—SHEET 1.
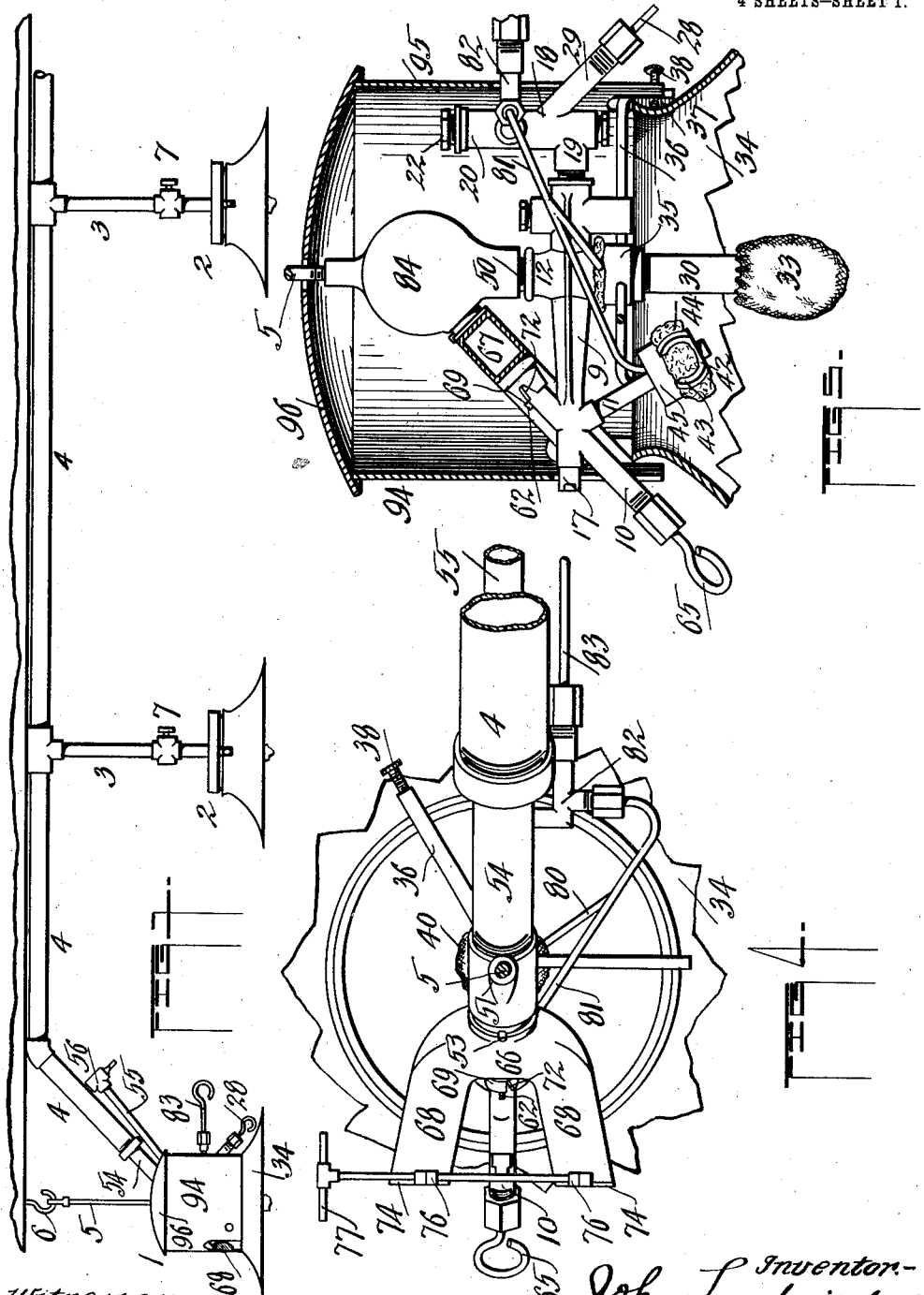

J. LANDSIEDEL.
LIGHTING SYSTEM.
APPLICATION FILED APR. 11, 1908.
1,025,196.
Patented May 7, 1912.
4 SHEETS—SHEET 2.
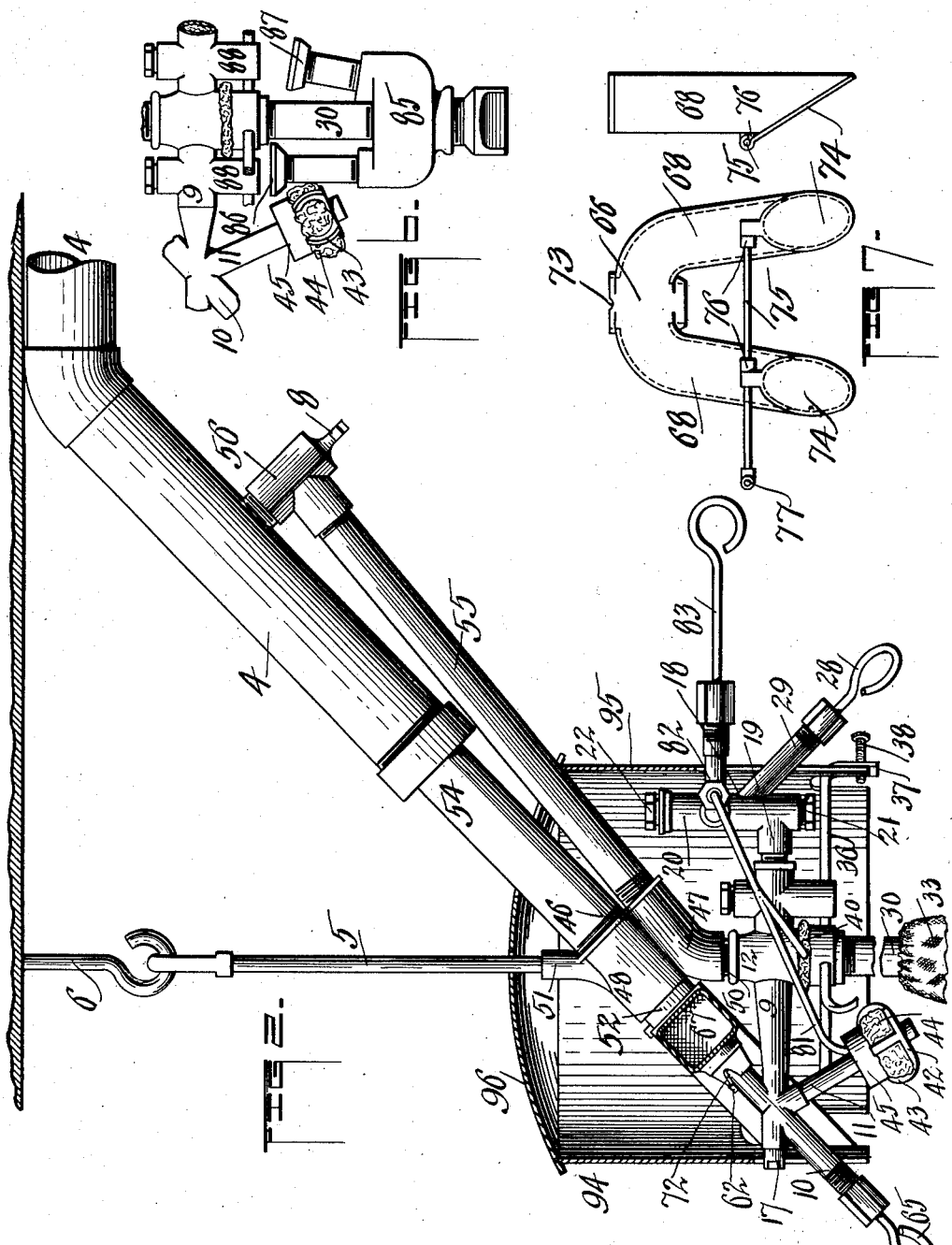

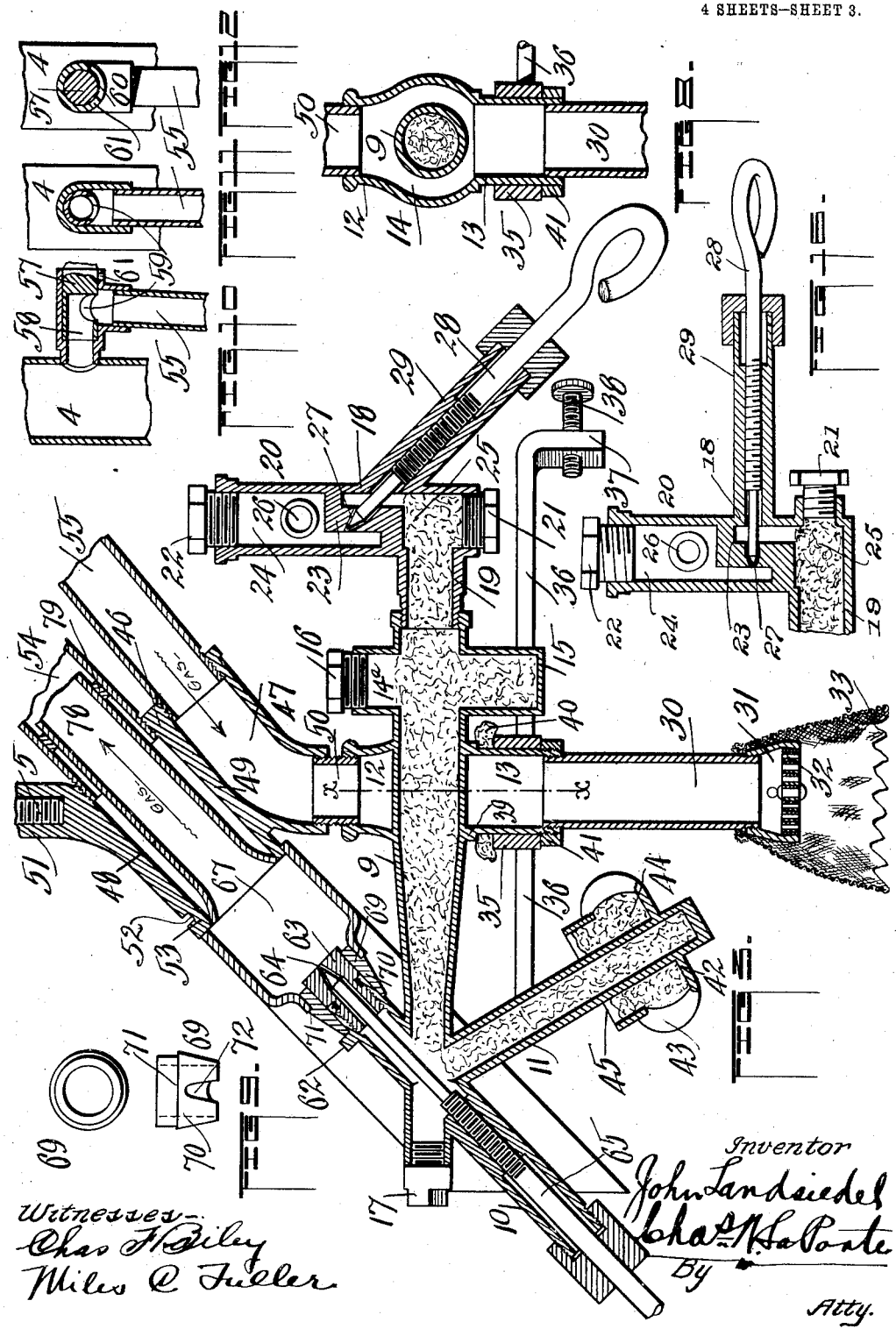

J. LANDSIEDEL.
LIGHTING SYSTEM.
APPLICATION FILED APR. 11, 1908.
1,025,196.
Patented May 7, 1912.
4 SHEETS—SHEET 4.
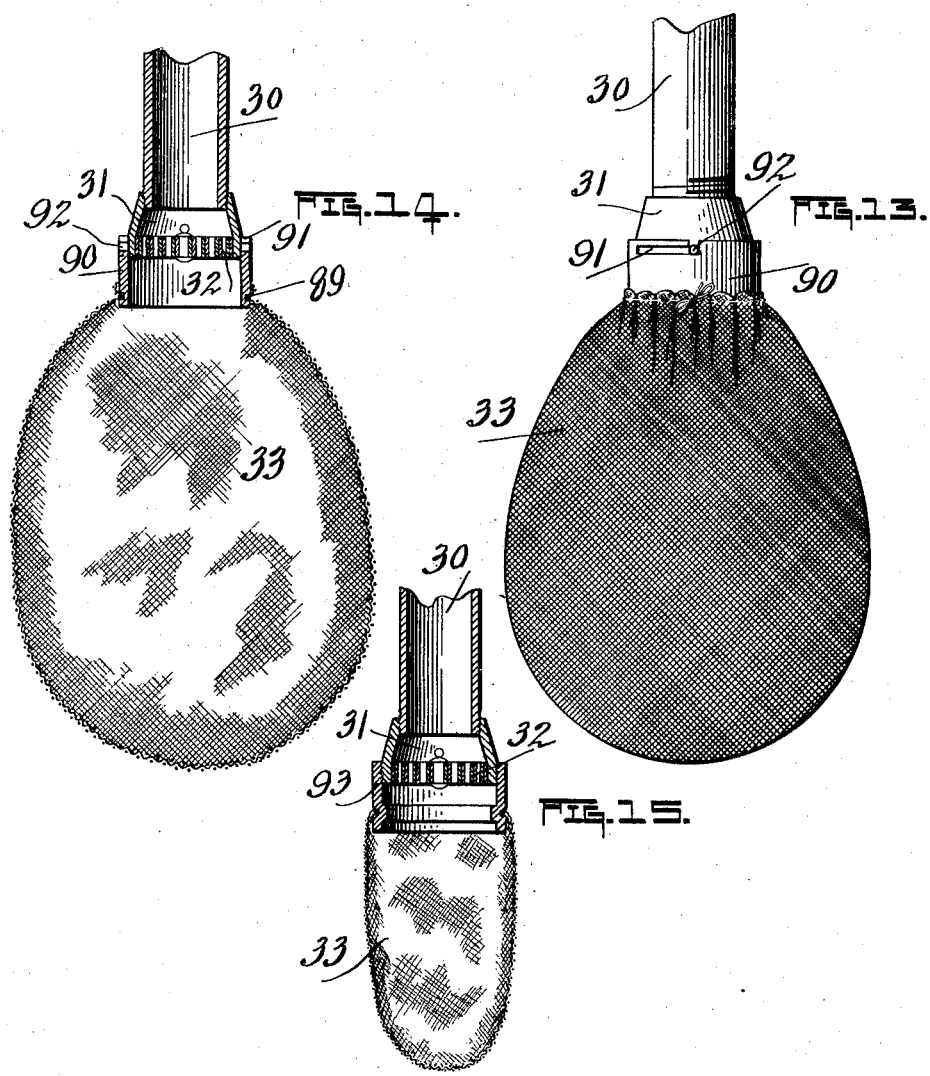

UNITED STATES PATENT OFFICE.

JOHN LANDSIEDEL, OF PEORIA, ILLINOIS.

LIGHTING SYSTEM.

1,025,196.  Specification of Letters Patent.  Patented May 7, 1912.

Application filed April 11, 1908. Serial No. 426,619.

*To all whom it may concern:*

Be it known that I, JOHN LANDSIEDEL, a citizen of the United States, residing at Peoria, in the county of Peoria and State of Illinois, have invented certain new and useful Improvements in Lighting Systems; and I do hereby declare that the following is a full, clear, and exact description of the invention, which will enable others skilled in the art to which it appertains to make and use the same.

This invention has reference to certain new and useful improvements in hydrocarbon apparatus and relates particularly to an illuminating system where a plurality of lamps are connected in series and wherein one of said lamps serves as the generating device for vaporizing the hydrocarbon from which it is fed in the form of a gas to the various lamps in the series as well as to the burner of the generating device.

Further objects and advantages of this invention will appear in the following description, and the novel features thereof will be particularly pointed out in the appended claims.

In the drawings Figure 1 is a greatly reduced side elevation showing my system installed with two lamps connected up by means of a pipe line with a generator also serving as a lamp; Fig. 2 is an enlarged side elevation of the generating lamp seen in Fig. 1 with the feed pipe leading therefrom, and with parts of said device broken away; Fig. 3 is a vertical sectional view of the greater portion of the generating lamp seen in Fig. 2, but on a somewhat larger scale; Fig. 4 is a plan of Fig. 2 with the exception of the housing or lamp covering; Fig. 5 is a view similar to Fig. 2 except that the construction is modified to illustrate how each lamp may be supplied with its own generator and omit the pipe line or similar feed; Fig. 6 is a view illustrating a modification of the structure shown in Fig. 2; Fig. 7 shows in front and side elevation the air-receiver; Fig. 8 is a sectional detail as the same would appear if taken on the line X—X of Fig. 3; Fig. 9 shows in plan and side elevation a locking-collar for retaining the air-receiver in place after once adjusted; Figs. 10, 11 and 12 are sectional detail views of the valve mechanism for governing the feed of the gas-vapor from the supply to the burner of the generating lamp; Figs. 13 and 14 show respectively, in side and sectional elevation a modified construction of burner and mantle support; Fig. 15 shows a further modification of burner and mantle support; Fig. 16 shows a modification of the feed-valve on the generator.

Like numerals of reference indicate corresponding parts throughout the figures.

Referring to Fig. 1, which serves to illustrate the application of the invention in connection with a pipe system employing a plurality of lamps supplied with gas from a lamp which not only generates its own gas but gas sufficient for each and all the lamps of a series, 1 denotes the lamp associated with a generator, while 2 denotes lamps, consisting of the usual burner and mantle, supported by feeders 3, connected with a main supply or gas service pipe 4, which leads from and communicates with the generator of the lamp 1. The lamp 1 may be suspended from the ceiling of a room by means of a rod 5 secured to the generating fixture of lamp 1 and to a hook 6 secured in the ceiling while the supply pipe 4 may be suitably secured to the ceiling in which manner the lamps 2 are suspended by the feeders 3. Each feeder has a valve 7 to control the supply of gas vapor to the burners of the lamps 2 with which said feeders connect, and a valve 8, operating in a manner to be more fully described controls the supply to the burner of the generating lamp 1.

Referring more particularly to the lamp which is indicated as 1, and which is provided with a generator for generating the gas, not only for its own burner but also for the burners of the lamps 2, the said generator comprises the elongated horizontal generating tube 9 preferably tapered toward its left hand end and has connected therewith the needle valve casing or tube 10, with which it communicates and the depending and preferably diagonally disposed extension 11 of the generating tube proper with which said tube communicates. At a suitable point in the length of the tube 9, the same has formed integrally therewith, the upper and lower vertical tubular extensions 12 and 13 which are united, as shown in Fig. 8 to form a chamber 14 about the body of the tube 9 which shall be continuous from the upper end of the extension 12 to the lower end of the extension 13, for purposes which will be further explained, and said tube 9 on its right hand end and in proximity to the extensions 12 and 13, is provided with the upper and lower extensions 14ª and 15 with which the said tube communicates. The lower extension 15 is formed with a solid end, while the end of the upper extension 14ª is opened and adapted to be closed by a threaded plug 16. This is also true of the left hand end of the tube 9 which is an open end and adapted to be closed by a plug 17. To the right hand end of the tube 9 is connected a coupling 18 through a horizontal extension thereof 19, which is screwed into the end of the tube 9 and said coupling is shown provided with a vertical portion 20 extending across the axis of the portion 19 and open at its lower end to be closed by a plug 21; in like manner, the upper end is open and adapted to be closed by a plug 22. The vertical extension 20 of this coupling is provided with a partition 23 separating the vertical extension into upper and lower chambers 24 and 25. The latter communicating with the horizontal extension 19 which is in communication with the tube 9, while into the chamber 24 is fed the hydrocarbon through a suitable feed pipe not shown, which is adapted to be coupled therewith, so as to feed hydrocarbon through the opening 26 in the wall of the chamber 24. The chambers 24 and 25 extend down and up upon opposite sides of the partition 23 in the coupling 18 and are adapted to be in communication through the aperture 27 therein, which is adapted to be closed by a needle valve 28 operatively carried through a tubular extension or casing 29 projecting from and preferably integral with the coupling 18.

While I have shown the casing 29 extending diagonally downward from the coupling 18 and have placed the plug 21 in the lower end of the vertical portion 20 of said coupling, it is to be understood that the casing 29 may extend outwardly at right angles from the portion 20 of the coupling 18 and the plug 21 instead of being in axial alinement with the portion 20, may be disposed in axial alinement with the tube 9 and the plug 17 at its opposite end, so as to provide for cleaning the feed tube 9 from either end thereof. See Fig. 16. A suitable filling, such as asbestos, is packed in the tube 9, the extensions 11 and 15 thereof, and in the lower portion of the coupling 18, as best seen in Fig. 3.

The burner for the lamp 1, which is preferably supported by the generating tube 9, consists of the tube 30 which is suitably connected with the inner lower end of the extension 13 of the tube 9, and to the lower end of the tube 30 is suitably secured, preferably by screwing thereto, a cone 31 which is provided with a screen or foraminated sheet 32, or other suitable filling which will cause the gas passing down through the tube 30 to spread as it enters the mantle 33 which is suspended from said tube 30 and preferably secured by fastening the mantle about the tube around the upper edge of the cone 31 which forms a shoulder and serves to retain the mantle as it is secured to the tube.

To support the shade, referred to as 34, and best seen in Figs. 1 and 5, I provide a shade holder consisting of the ring or collar 35 having a plurality of radial arms 36 which have the depending outside portions 37 through which pass the threaded stems 38 which are adapted to engage with and sustain the shade 34 when in position. The ring or collar 35 is passed up onto the depending extension 13 of the tube 9, to fit loosely thereon and to have its upper edge spaced a short distance below a shoulder 39 on the extension 13 just beneath the body of the tube 9, between which and the collar or ring 35 asbestos or other suitable filling 40 is retained for serving as a torch directly beneath the tube 9 and about the extension 13. To lock the ring or collar 35 in position, the threaded collar 41 is secured to the lower end of the extension 13 after the ring or collar has been placed thereon in the position shown, particularly in Fig. 3. I also provide in connection with the extension 11 of the tube 9, a torch consisting of the radially disposed extension 42 formed integrally with or suitably secured to the extension 11 at or near the lower or free end thereof and said radial extension is provided with the upturned portions 43, between which and the outside wall of the extension 11 asbestos or other suitable filling 44 is placed, which is retained intact by means of the ring or collar 45 which is slipped down over the asbestos or other suitable filling and inside of the free upper ends of the inturned extensions 43, as shown.

46 denotes a coupling having parallel tubular portions 47 and 48 divided by a partition 49. The inner lower end of the tubular portion 47 of the coupling 46 is connected with the upper end of the extension 12 of the tube 9 by a short vertical nipple 50 which serves to support said coupling upon the tube 9, and the tubular portion 48 is provided at its upper end with a short neck 51 with which the rod 5 is connected for supporting the lamp 1 and its generator in the manner shown in Fig. 1, while the opposite lower end of said tubular portion 48 is provided with a reduced extension 52 see Figs 2 and 3 having the laterally extending lug 53, serving a purpose to be described.

The feed pipe 4, previously referred to, is connected in a suitable manner with a feeder 54, preferably somewhat smaller in diameter, which, at its lower end is connected with the upper end of the tubular portion 48 of the coupling 46; while connected with the upper end of the tubular portion 47 of the coupling 46 is a pipe 55 serving as a gas conduit, which extends up alongside of the feeder 54 and a portion of the pipe 4, and is adapted to communicate with said pipe 4 through a coupling 56 which is provided with the valve 8 aforesaid, for controlling the travel of the gas from the pipe 4 to the burner of the lamp 1, which, passing through the coupling 56, pipe 55 and tubular portion 47 of the coupling 46, will pass down and around the tube 9 through the nipple 50, the extensions 12 and 13 of the tube 9 and into the pipe or tube 30 supporting the mantle.

The construction of the valve 8 operating in the coupling 56, is as follows: It is preferably an elongated stem 57 rotatably mounted in said coupling and its inner end for a short distance is made tubular as at 58 with a part thereof, cut away to form an opening 59, which, when the said valve is in the position shown in Figs. 10, 11, and 12, provides a way of communication between the pipe 4 and the pipe 55. The coupling, through which the stem 57 operates, is slotted as at 60, and working in said slot is a pin 61 projecting laterally from the stem 57. The pin and the slot provide a means of regulating or controlling the rotary movement, which may be imparted through the stem 57; that is to say, when the stem has been moved to a position which would place the opening 59 so as to form communication between the pipe 4 and the pipe 55, the pin 61 will assume that position shown in Fig. 12, and when the stem has been moved to a position to shut off communication between the pipe 4 and the pipe 55, the pin will be in the opposite end of the slot 60.

The needle valve casing or tube 10, not only extends below the main tube portion 9 of the generator, but also extends up above the same for a short distance, and projecting from said upper portion at a point suitably disposed below the upper end thereof, is a lug 62, and detachably secured in the upper end of the casing or tube 10 by being preferably screwed therein, is a plug 63, which, for a portion of its length is of the same diameter as the casing or tube 10, and smooth on its external surface to conform to the face of the casing or tube, and has an aperture therethrough 64, adapted to be closed by a needle valve 65 operatively carried through said casing or tube 10, in the manner best seen in Fig. 3.

The upper end of the casing or tube 10 and the plug 63 carried therein, are spaced a suitable distance from the lower end of the tubular portion 48 of the coupling 46, with which the feeder 54 is suitably connected, and the arrangement and disposition of the casing or tube 10 and the tubular portion 48 of the coupling 46, is such that they are both in axial alinement, although spaced apart from one another as specified, which also places a suitable portion of the inner end of the feed pipe 4 in axial alinement with said casing or tube 10 carrying the needle point valve 65, which is for the purpose of controlling the discharge of the vapor from the generating tube 9, which it is provided shall find its way to the feed pipe 4 and between the time of its discharge from the aperture 64 of the plug 63 and its entering the pipe 4 to be suitably mixed with air for forming a gas in suitable proportion to be conveyed through the pipe 4 to the lamps in the series, and to the lamp in connection with the generator 9.

The air receiver which is employed for conveying air to be mixed with the vapor as it is discharged through the aperture 64 of the plug 63, is preferably substantially U shaped, and consists of the head 66 having a chamber 67 formed therein, which communicates with tubular bifurcated extensions 68, which curve outwardly from said head 66 and downwardly as shown in Fig. 7, so that when said air receiver is in operative position in connection with the generator, as will be described, the said extensions 68 will extend down upon opposite sides of the casing or tube 10, as seen in Figs. 2, 3 and 4. I have provided that this air receiver may be detachably supported with the head 66 thereof, interposed between the upper end of the casing or tube 10 and the lower end of the tubular extension 48 of the coupling 46, and it is secured in place in the following manner:—69 is a locking collar or sleeve having the tapered portion 70 and the shoulder portion 71, best seen in Fig. 9, and in the tapered portion of said collar or sleeve, is provided the depression or groove 72. This collar or sleeve is adapted to be carried on the upper end of the casing or tube 10 and beyond the lug 62 against which the lower end thereof, will rest and when in position, encircles the upper end of the plug 63, see Fig. 3. Said collar or sleeve is designed to have a limited slidable relation with said casing or tube 10, and this is accomplished by rotating said collar or sleeve 69 on the casing or tube 10 until the groove 72 therein, coincides with the lug 62, when said collar or sleeve may be shoved downwardly on the casing or tube 10 with the lug 62 having a sliding relation in said groove. When the collar 69 has been placed in the position just described, the head of the air receiver is inserted between the upper inner end of the casing or tube 10 and the lower end of the tubular portion 48 of the coupling 46; said upper end of the head 66 of the air receiver being adapted to be passed over the end of the tubular portion 48 of the coupling 46 and having a groove 73 in which will be inserted the lug 53 projecting from the tubular portion 48 and thereby hold said head non-rotatably on the tubular portion 48 of the coupling 46. The lower portion of the head 66 of the air receiver is of a diameter to fit over the shouldered portion 71 of the collar or sleeve 69, or is of such a diameter that when the head of the air receiver has been placed in that position just previously described, said collar or sleeve 69 may be shoved upwardly on the casing or tube 10, so as to cause the upper end thereof to enter into the lower portion of the head 66 and bring the edge thereof in juxtaposition to the shouldered portion of said collar or sleeve 69, when said collar or sleeve may be rotated on the casing or tube 10, so as to cause the lower end thereof to rest against the lug 62, when said collar or sleeve 69 and the air receiver will be firmly locked in that position in which the parts are shown in Figs. 2, 3 and 4.

The receiving ends of the extensions 68 of the air receiver may be open at all times, or, if it is desired, valve plates may be operatively connected with said open ends of the extensions 68, which may be adjusted for controlling the supply of air passing into the extensions of said receiver. Such a device is very clearly shown in Fig. 7, where the valve plates are indicated as 74, each of which is carried by a rod 75 which passes through and has bearing in lugs 76 projecting from the extensions 68 of said receiver, and on the outer end of said rod, is provided a hand hold 77 to enable an operator to rock the rod 75 in its bearings and thereby adjust the position of the valve plates 74. The rod 75, in this instance, is intended to have a snug fit in the bearings 76, so that friction may be relied upon to hold the valve plates when once adjusted.

I have described the feed pipe 4 as being connected with the coupling 46 through a feeder 54, which is somewhat reduced in diameter. I also provide in connection with the feeder 54, an inlet gas conduit 78, which is a pipe somewhat smaller in diameter than the feeder 54, and extends up into said feeder a suitable distance and passing through the tubular extension 48 of the coupling 46, has its receiving end flush with the lower end of the tubular extension of said coupling. The receiving end of said gas conduit, is flared as best seen in Fig. 3, so as to fit snugly the inner wall of the lower end of said tubular extension 48 and for the purpose of spacing or centering the said gas conduit 78 in the feeder 54, a collar or ring 79 is placed around said conduit to fit snugly the inner wall of the feeder 54 as shown in Fig. 3. With an apparatus, such as I here show and describe, it is necessary to adjust the intake of the feed pipe 4 when using a few lamps in the system or a great number. That is to say, if there are only a few lamps connected up in the system, the intake for the gas should be much smaller in diameter than it would be if there were a large number of lamps connected up in said system; it is also preferable to contract the opening of the intake, which will obviate the roar created by the suction for drawing the mixed air and vapor in the form of gas into the intake of the feed pipe. For the purpose of facilitating a perfect feed, in addition to regulating the intake, as above described, I aline the intake of the feed pipe, the discharge aperture of the vapor from the generator, and the air receiver, so that there is substantially a straight movement of the air and the vapor which commingle in the chamber 67, previously described, which is at the mouth of the intake through the feed pipe as shown.

I have provided feeders for the torch 40 on the depending extension 13 of the tube 9 and for the torch surrounding the lower end of the extension 11 of said tube 9. These feeders are the tubes 80 and 81 which lead respectively to the torches above mentioned, and are united in a tube leading to a coupling 82, which is suitably connected with the chamber of the extension 20 of the coupling 18 and is provided with a needle point valve 83 for regulating and controlling the supply of hydrocarbon or other fluid which it may be desirable to use, with which the torches may be saturated, for the purpose of heating the generator to vaporize the hydrocarbon admitted thereto.

In Fig. 5, each lamp is shown to be provided with its own generator. That is to say, instead of connecting the lamps up in series, as shown in Figs. 1, 2 and 3, each lamp is independent by itself, and the gas supplied through the burner thereof, is generated by a generating apparatus substantially like that shown in Figs. 2 and 3, but the gas which is formed by the mixture of the vapor and the air in the chamber of the head 67 of the air receiver, is passed directly into a dome 84, connected with the generating tube 9 and passes down and around the tube 9 substantially as was described in connection with Fig. 3 and from thence to the burner supporting the mantle.

Fig. 6 illustrates a further modification, wherein the generating fixture does not have a burner and mantle connected therewith, but rather to the tube 30, is connected a yoke 85, to which are attached and extend upwardly therefrom, burners 86 and 87, which are directly beneath corresponding depending extensions 88 of the body of the generator which serve as heat catchers whereby the flame from the burners will bear directly against the same and thereby facilitate the quick heating of the generator and maintain in such generator the heat necessary to generate sufficient gas to feed a series of lamps connected up in series like as shown in Fig. 1.

In Figs. 2, 3 and 5, the mantle 33 is shown to be loosely suspended from the cone tip 31 of the burner. That is to say, the mantle is provided with securing means so that the upper end thereof is drawn in above and around the top edge of the cone which is shown having a threaded connection and detachable from the tube 30. However, the mantle so used is not shrunk until after put into service in connection with a lamp. In Fig. 13 and Fig. 14, which show a modified construction for the lower end of the tube 30, being respectively a side elevation and vertical cross-section, the mantle is securely fastened in an annular groove 89 of a collar 90, said collar being provided with slots 91, which are adapted to have engagement with pins 92 projecting radially from a cone tip similar to what is shown in Fig. 3, whereby said collar may be revolved into a position on said cone-tip for locking the same thereon. In Fig. 15, which illustrates a still further modification of the construction for the lower end of the tube 30, and the support 93 for the mantle is shown a collar which is internally threaded at its upper end, so as to have a threaded engagement with the tip 31, which, in this instance, is externally threaded, and said collar at its lower end, is provided with an external groove in which a mantle, which has been previously shrunk, is fixedly secured, by being attached thereto substantially as shown in said figure.

I provide in connection with the generator of the lamp 1, best seen in Figs. 1 and 2, and also in connection with the generator of the lamp in Fig. 5, a housing 94, comprising the tubular side wall 95 and preferably the dome top 96. This housing has a central opening through the dome to provide for carrying the rod 5 therethrough, and its wall is suitably slotted to adapt the said housing to be fitted over the fixtures of the generator of said lamp 1, so that all of the valves of said generator may be operated from without the housing and to provide for the extensions 68 of the air receiver projecting through the said housing so as to take in air and pass it through the chamber 67 of the air receiver to be mixed with the vapor prior to the vapor entering the feed pipe 4. With the provision of a housing, such as I have shown, the air taken into the air receiver, by the time it reaches the chamber 67 thereof, is of nearly the same temperature as the vaporized hydrocarbon, which mixes with said air, in the manner previously described, because the said housing will retain the heat therein and uniformly heat the several parts or connections of the generator. In this connection, attention is called to the chamber 24 of the coupling 18. After the burner has been lighted, and the heat accumulated within the housing 94, the casing for said chamber becomes very hot and the hydrocarbon as it enters the same, will be almost instantaneously vaporized, which facilitates greatly the perfect operation of the feed and by reason of the peculiar construction of this chamber, and the size of the same, a certain amount of the vapor, which will accumulate therein and which is under pressure, will form a cushion which will take up any fluctuation or unsteadiness which may be present in the feed and cause the lamps to burn uniformly and without that unsteadiness which is so often present in lamps of this character.

Having thus fully described my invention, what I claim and desire to secure by Letters Patent of the United States, is:—

1. In an apparatus of the character described, the combination of a plurality of illuminating lamps, each of said lamps provided with a burner to which is attached a mantle, a generator tube connected with one of said lamps, and provided with a chamber surrounding the same, an inverted burner tip in communication with said chamber surrounding said generating tube, a feed pipe connected with the generating tube, feed laterals connected with said pipe, and also connected with the lamps aforesaid, and a feeder communicating with said feed pipe above said generating tube, and also communicating with the chamber surrounding said generating tube.

2. In an apparatus of the character described, the combination of a generating tube, a depending tubular extension from said tube, said extension provided with a torch comprising a plurality of radial extensions having upturned ends, a non-combustible material between the ends of said radial extensions and the tubular extension, and a ring encircling the tubular extension and disposed within the circle described by the upper ends of said radial extensions.

3. In an apparatus of the character described, the combination of a generating tube having a discharge aperture, a needle valve for closing said aperture, a gas conduit having its receiving end spaced from the apertured end of the generating tube, and in axial alinement with said needle valve in the generating tube, a supplemental conduit for the receiving end of the gas conduit having a flared receiving portion, an air receiver, and means adjustably carried on the apertured end of the generating tube for removably supporting said air receiver between the apertured end of the generating tube and the receiving end of the gas conduit.

4. In an apparatus of the character described, the combination of a generating tube having a discharge aperture and provided with a radially extended lug projecting from said tube near the end having the aperture, a gas conduit having its receiving end spaced from the apertured end of the generating tube, an air receiver, and a slidable and rotatable collar on the apertured end of the generating tube adapted to lock the air receiver in position between the gas conduit and the apertured end of said generating tube, said collar having a slot to coincide with the lug on the generating tube.

5. In an apparatus of the character described, the combination of a generating tube having an apertured end, a needle point valve for closing said aperture, a lug projecting laterally from the tube near its apertured end, a gas conduit having its receiving end spaced from the apertured end of the generating tube, a collar provided with a shoulder and slidably and rotatably carried on the apertured end of the generating tube, said collar provided with a slot whereby, when said slot is brought coincident with the lug on said tube, it may slide thereon, an air receiver adapted to have its outlet end interposed between the receiving end of the gas conduit and the apertured end of the generating tube, and locked in such position by engagement therewith of the shouldered portion of said collar.

6. In an apparatus of the character described, the combination of a generating tube having a needle valve casing disposed transversely to said tube and having an apertured end, a needle valve operatively mounted in said casing for closing said aperture, a gas conduit disposed in axial alinement with the valve stem and having its receiving end spaced from the apertured end of the needle valve casing, an air receiver having bifurcated receiving portions adapted to be disposed upon opposite sides of the needle valve casing, and united in a head portion adapted to be supported between the receiving end of the gas conduit and the apertured end of the needle valve casing, and locking means on the needle valve casing for removably supporting said air receiver.

7. In an apparatus of the character described, the combination of a generating tube having a needle valve casing disposed transversely thereto, and provided with an apertured end, oppositely disposed extensions from said generating tube uniting to form a chamber about the same, a tube connected with one of said extensions and depending from the generating tube, an inverted burner tip having a threaded connection with the lower end of said last mentioned tube, a coupling connected with the other extension of said generating tube, and having a tubular portion with its lower end spaced from and in axial alinement with the apertured end of the needle valve casing, a delivery pipe connected with the opposite end of said tubular portion of said coupling, a return gas conduit communicating at one end with the delivery pipe and connected at its opposite end with said coupling, and an air receiver removably supported by said generating tube with the head portion thereof interposed between the apertured end of the needle valve casing and the lower end of the tubular portion of said coupling.

8. In an apparatus of the character described, the combination of a generating tube communicating at one end with a needle valve casing having an apertured end, a coupling connected with the opposite end of said generating tube, said coupling provided with an extension disposed at right angles to said generating tube, said right angle extension of said coupling provided with a partition for dividing said coupling into upper and lower chambers, said partition having a needle valve aperture whereby communication may be had between said chambers, and a needle valve operatively carried in said coupling for closing the aperture in said partition.

In testimony whereof I affix my signature, in presence of two witnesses.

JOHN LANDSIEDEL.

Witnesses:
CHAS. W. LA PORTE,
LAURA E. CLAYPOOL.

---

Copies of this patent may be obtained for five cents each, by addressing the "Commissioner of Patents, Washington, D. C."